United States Patent [19]

Beichel

[11] 4,073,138
[45] Feb. 14, 1978

[54] MIXED MODE ROCKET ENGINE

[75] Inventor: Rudi Beichel, Sacramento, Calif.

[73] Assignee: Aerojet-General Corporation, El Monte, Calif.

[21] Appl. No.: 473,560

[22] Filed: May 28, 1974

[51] Int. Cl.$^2$ ............................................. F02K 9/02
[52] U.S. Cl. ...................................... 60/245; 60/250; 60/259; 60/267; 60/39.46 P
[58] Field of Search ................. 60/245, 250, 257–260, 60/267, 39.46 R, 39.46 P

[56] References Cited

U.S. PATENT DOCUMENTS

| | | | |
|---|---|---|---|
| 3,636,712 | 1/1972 | Kaufmann | 60/260 |
| 3,828,551 | 8/1974 | Schmidt | 60/259 |
| 3,910,037 | 10/1975 | Salkeld | 60/250 |
| 3,955,784 | 5/1976 | Salkeld | 60/245 |

OTHER PUBLICATIONS

"Propulsion & Propellants", Army Material Command Pub. No. 706-282, U.S. Army Materiel Command, Wash. D.C., Aug. 1963; pp. 50, 51.
Salkeld, R., "Mixed-Mode Propulsion for the Space Shuttle", Astronautics & Aeronautics, Aug. 1971, pp. 52-58.
Salkeld, R., et al., "Reusable One-Stage-To-Orbit Shuttles", Astronautics & Aeronautics, June 1973, pp. 48-58.
"Space Shuttle Engines Stress Low Cost", Automotive Engineering, Oct. 1972, pp. 22-25.

Primary Examiner—Carlton R. Croyle
Assistant Examiner—Robert E. Garrett
Attorney, Agent, or Firm—John S. Bell

[57] ABSTRACT

Four embodiments of high-thrust rocket engines, each having separate propellant delivery apparatus for each propellant to be delivered to the engine thrust chamber, are illustrated herein. One engine is designed to provide a high thrust using only one fuel and one oxidizer. The other three engine embodiments are all designed to use different propellants having different densities during different portions of a rocket flight. Each of these additional engines includes the basic structure of the first. The first engine is thus not only an effective engine, but also a building block that can be easily modified to provide an engine capable of operating effectively with different propellants.

16 Claims, 4 Drawing Figures

MIXED MODE ROCKET ENGINE

BACKGROUND OF THE INVENTION

1. Field of the Invention

High-thrust, liquid propellant rocket engines capable of delivering a payload to orbit.

2. Brief Description of the Prior Art

The design of liquid propellant rocket engines capable of delivering a payload to orbit is an extremely complex and difficult art. Chemical (liquid) propellants possess limited energy. It is difficult to design an engine that utilizes this energy effectively enough to deliver a payload to orbit. The most effective known rocket engines provide thrust-to-weight ratios that are only slightly greater than those provided by engines incapable of delivering any payload to orbit.

Rocket engine design is further complicated by the fact that each component of a rocket engine interacts with every other component in a very complex manner. Attempts to improve one component or portion of an engine often produce an undesirable effect in some other portion of the engine that more than offsets the attempted improvement.

One relatively effective known rocket engine capable of delivering a payload to orbit comprises a thrust chamber, fuel feed and oxidizer feed pipelines, a single turbopump assembly for pumping both fuel and oxidizer through those pipelines to the thrust chamber, and a single preburner combustion chamber for generating a gaseous discharge that drives the turbopump. The preburner combustion chamber is disposed in the fuel supply pipeline and connected to receive a small quantity of oxidizer to provide controlled fuel-rich combustion. In operation, the preburner generates sufficient heat to convert the liquid fuel to a gas. Gaseous discharge from the preburner drives the turbopump which in turn pumps both fuel and oxidizer to the combustion chamber. Heat exchanger apparatus transfers heat from the preburner to the oxidizer feed pipeline so that both fuel and oxidizer are converted to gases before entering the thrust chamber. The gaseous fuel and oxidizer mix rapidly in the thrust chamber and interact combustibly to generate a gaseous output flow that produces a high thrust. Embodiments of this engine burning a hydrocarbon fuel and using liquid oxygen oxidizer are known that inject propellant into the thrust chamber at up to 1,300 psia and provide a thrust-to-weight ratio as high as approximately 90 at sea level.

The problems presented to one attempting to design a new rocket engine or improve an existing one can be appreciated by considering some of the many complex interrelationships between the different components of the rocket engine described above. The thrust generated by that engine is determined at least in part by the pressure at which the propellants are injected into the thrust chamber. Thrust can be increased by increasing the pressures at which the propellants are supplied to the thrust chamber. Propellant injection pressure is dependent upon the operating temperature of the preburner combustion chamber and can be increased by raising the operating temperature of that chamber. But, if the operating temperature of the preburner combustion chamber is raised to too high a level in an attempt to increase thrust, additional apparatus will be required for cooling the walls of the preburner combustion chamber. This additional cooling apparatus may be so heavy that it more than offsets the desired increased thrust. And, increasing the pressure at which propellants are injected into the thrust chamber may also require alteration of other portions of the engine. For example, in the above-described engine, the oxidizer is directed through cooling passageways in the thrust chamber wall before being injected into the thrust chamber. The oxidizer thus absorbs heat and thereby cools the thrust chamber wall. Changes in the injection pressure of any propellant also change the mass flow and therefore the heat transfer characteristics of that propellant so that the thrust chamber cooling scheme may have to be modified. Changes in propellant injection pressure may also require a larger, heavier turbopump to accommodate the higher temperature and pressure gaseous discharge from the preburner and also to provide the desired higher injection pressures. Thus, a straightforward attempt to increase the thrust-to-weight ratio of an engine by increasing the operating temperature of a preburner to thereby increase the pressures at which the fuel and oxidizer are injected into the thrust chamber may require changes in other engine components such that the thrust-to-weight ratio of the engine is actually reduced. Any engine modification altering the pressure at which propellant is injected into the thrust chamber must affect the other components of the engine in a manner that produces an overall beneficial result.

The complicated interrelationships between different rocket engine components that make it difficult to increase propellant injection pressure also make it difficult to achieve other objectives. Safety, for example, is an important consideration. Since one turbopump assembly is used to pump both propellants, very heavy and sophisticated seals are needed to prevent any leakage across that turbine that could mix combustibly interactive propellants and produce an explosion. These seals increase the weight and complexity of the engine. But, turbopump modifications cannot be made considering only the safety factor. Engine weight, thrust, propellant injection pressure, propellant mass flow, and heat transfer factors must also be considered.

All prior art liquid propellant rocket engines use only one fuel and one oxidizer to generate thrust. It has been recognized that an engine capable of utilizing different propellants having different densities during different portions of a rocket flight would be substantially superior to an engine that burns only one fuel. Such an engine would make a single stage vehicle for delivering a payload to earth orbit and then returning, a practical reality. A number of individuals have pointed out the advantages and desirability of developing such an engine. But, no one has been able to design a practical embodiment. The problems in obtaining a desirable balance between the structural and operational characteristics of the different interrelated components of a rocket engine, as described above for an engine using one fuel and one oxidizer, are compounded significantly when additional propellants having different densities and thus different masses, momentums, flow characteristics, and heat transfer characteristics are considered.

The prior art does not teach how an effective propellant delivery system for pumping different propellants having different densities, mass flow, heat transfer, and other characteristics, to a thrust chamber should be designed. That is, the prior art does not indicate whether the propellant delivery system in an engine for effectively utilizing different propellants during different portions of a rocket flight should be similar to one of the many different propellant delivery systems used in different engines designed to operate with only one fuel and one oxidizer and, if so, which one, or whether it should be different from all of those prior art systems.

The prior art does not teach an effective scheme for injecting different propellants into the thrust chamber during different portions of a flight. The injection orifices on the face of an injector in an engine that burns a high-density fuel are spaced differently from those on an injector in an engine for burning a low-density fuel. Significant problems must be overcome with any injector design approach that one might select in attempting to provide a rocket engine capable of using different propellants. For example, if one designing an engine attempts to maintain the difference between injector spacing in engines that use high density and low density propellants and inject the different propellants into the same thrust chamber through different orifices, he risks a heat distribution across the injector face that will burn out the injector during any portion of a rocket flight when one propellant is either not being used or is being used only in small quantities. But, on the other hand, if he attempts to inject different propellants having different densities through the same orifices during a different portion of a rocket flight, he faces difficult problems in insuring that the different propellant combinations having different densities, mass flow rates, momentum ratios, and so forth, each mix in a desirable manner and provide stable, high thrust generating combustion. The prior art does not teach how to accomplish this without encountering an unacceptable weight or performance penalty in some portion of the engine.

The prior art also does not teach how an engine designed to utilize different propellant combinations during different portions of a rocket flight should be cooled. There are significant advantages and drawbacks to any cooling scheme that can be hypothesized. Consider, for example, an engine designed to use hydrocarbon fuel, which is a dense fuel, for one portion of a flight, and hydrogen, which is a low density fuel, for another. Liquid oxygen is an oxidizer for both fuels. Hydrogen has a much higher heat capacity than hydrocarbon fuel, and oxygen, and therefore would be the best coolant. But, the drawback in attempting to use hydrogen as the coolant is that it is not used to provide thrust during all portions of a flight. A cooling system designed to use different propellants for cooling during different portions of a flight could be considered. The drawback involved is that it would have to be relatively complicated. Oxygen is supplied to the engine whenever either one of the fuels are, and therefore is available for cooling. The drawback involved is that it has a much lower heat capacity than hydrogen. The prior art does not teach what cooling structure should be used to achieve both good cooling and also operate in good harmony with the other components of a rocket engine designed to use different propellants during different portions of a mission.

SUMMARY OF THE INVENTION

This invention comprises a safe, reliable rocket engine capable of providing very high thrust-to-weight ratio performance. The engine comprises a separate propellant delivery system for each propellant to be delivered to a thrust chamber for receiving combustibly interactive fluid propellants and providing a thrust generating gaseous output flow. Each propellant delivery system includes a pump, and a gas generator for driving that pump. In each of the embodiments illustrated herein, each gas generator comprises preburner apparatus for combustively generating sufficient heat to convert one propellant to a gas.

Four embodiments of the rocket engine of this invention are illustrated herein. One embodiment is designed to utilize only two propellants, namely one fuel and one oxidizer. The other three embodiments are designed to use different propellants having different densities during different portions of a flight. In each embodiment, the inclusion of a separate propellant delivery system for each propellant provides an independent control of each propellant that facilitates operation of the engine in different modes. The use of separate delivery systems for each propellant also permits each component of each delivery system to have a design and size that is optimum for handling the one and only propellant that is to be delivered by that delivery system.

The particular components of the separate systems for delivering different propellants to the engines illustrated herein provide the following advantages. The separate pumping systems for each propellant make the engine very safe by preventing the possibility of any leakage across a turbopump that would mix combustible interactive propellants and cause an explosion. The use of separate preburner apparatus for each propellant permits the rocket engine to provide a high thrust-to-weight ratio output because the different preburners can together generate sufficient energy to inject propellant to the thrust chamber at very high pressures, without requiring operating of any preburner combustion apparatus at such a high temperature that would require addition of preburner cooling apparatus to the engine. The conversion provided by the different preburners of each propellant to a gas before injection into the thrust chamber also increases the thrust-to-weight ratio of the engine by causing the propellants to mix and burn very rapidly after entering that chamber so that the thrust chamber can therefore have a relatively small and lightweight design. In engine embodiments designed to utilize different propellants during different portions of a flight, the conversion of each propellant to a gas prior to injection into the thrust chamber minimizes differences in the mixing characteristics of different propellant combinations having different densities, mass flow rates, and momentum ratios. Different propellants can thus be injected into the thrust chamber through the same injector orifices during different portions of a flight, and good propellant mixing achieved during each flight portion.

Each embodiment illustrated herein uses liquid oxygen to provide the entire thrust chamber cooling. The concept of using oxygen, which has a relatively small heat capacity, to provide the entire cooling in a system that also exothermically converts that oxygen to a gas prior to injection into the thrust chamber, and that furthermore uses that gaseous oxygen flow to drive pumping apparatus, is a significant, unobvious feature of this invention. Oxygen loses pressure as it flows to the thrust chamber and performs all these functions. Two of the embodiments illustrated herein include a two-stage pump wherein the first stage pumps the liquid oxygen to a first predetermined pressure before it cools the thrust chamber, and the second to a second pressure after it has cooled that chamber. The use of two pumping stages minimizes the initial pressure to which the liquid oxygen must be pumped in order to have that propellant enter the thrust chamber at a desired pressure. The two-stage pump thereby minimizes the strength and weight required of various conduit, pump, and preburner components.

BRIEF DESCRIPTION OF THE DRAWINGS

Further objects, features, and advantages of this invention, which is defined by the appended claims, will become apparent from a consideration of the following drawings, in which:

DETAILED DESCRIPTION OF THE PREFERRED EMBODIMENTS

Figure 1:
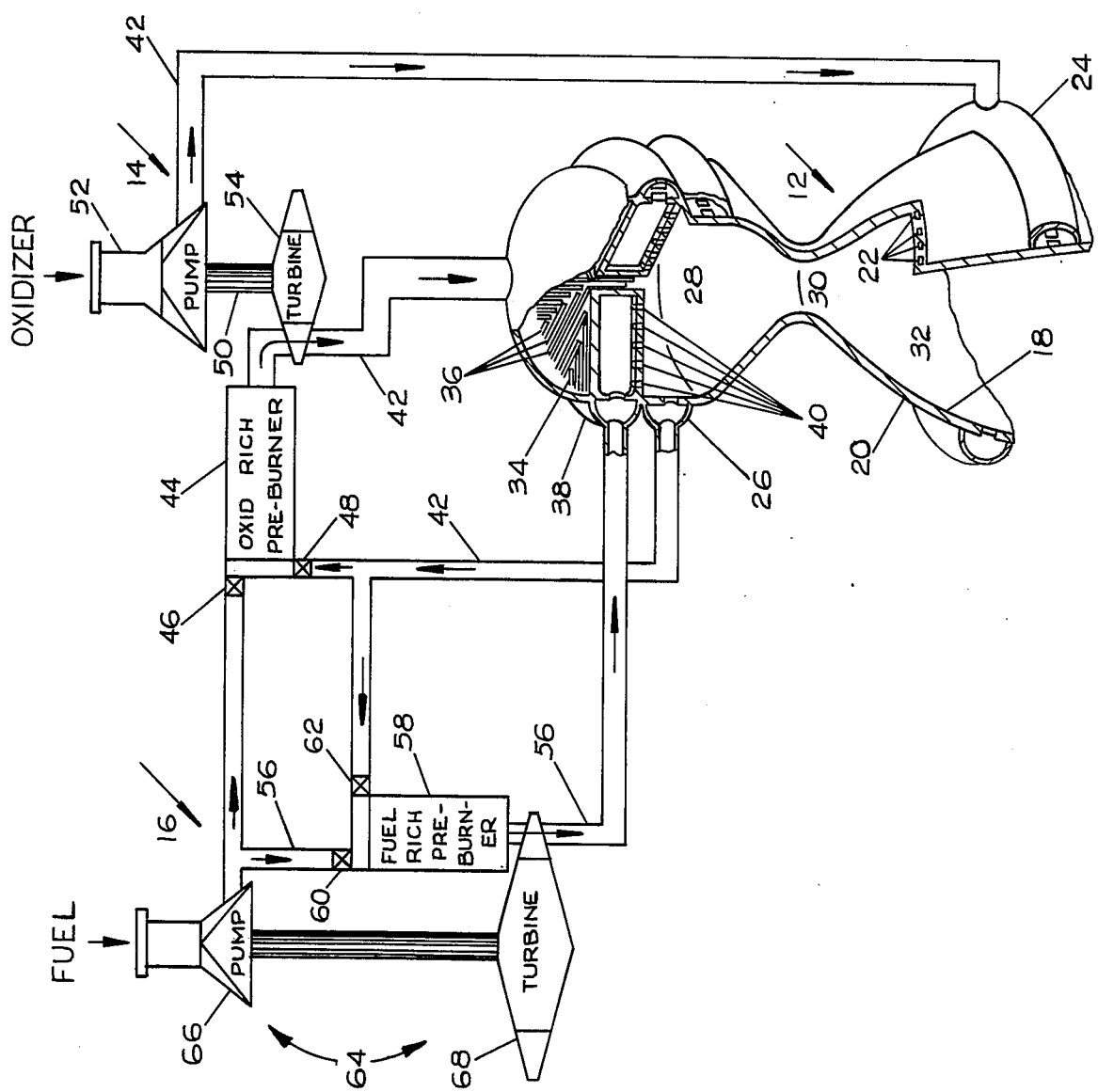
FIG. 1 is a schematic, partially cut-away, box-level diagram of an embodiment of the rocket engine of this invention designed to use one fuel and one oxidizer.

FIG. 1 illustrates a rocket engine 10 comprising a thrust chamber 12, first propellant delivery apparatus 14 for delivering oxidizer to the thrust chamber 12, and second propellant delivery apparatus 16 for delivering fuel to thrust chamber 12.

Thrust chamber 12 includes an inner wall 18 and an outer wall 20. Coolant flow passageways 22 that communicate with an input manifold 24 and an output manifold 26 are formed between those two walls. The thrust chamber walls are shaped to define a combustion chamber section 28, a throat section 30, and an output nozzle 32. A fuel injector 34 is disposed in the combustion chamber portion 28 of thrust chamber 12. Injector 34 comprises a plurality of thin hollow vanes 36, each communicating with a manifold 38, and each also having a plurality of output orifices 40 so that fuel delivered to manifold 38 will flow into each of the vanes 36 and be injected into combustion chamber 28 through orifices 40.

The first propellant delivery apparatus 14 for delivering the oxygen to thrust chamber 12 includes an oxidizer delivery pipeline 42. Pipeline 42 interconnects with manifolds 24 and 26 so that oxygen being delivered to thrust chamber 12 will absorb heat and thereby cool the thrust chamber walls. Propellant delivery apparatus 14 also includes a preburner combustion chamber 44, flow control valves 46 and 48, and a turbopump 50. Turbopump 50 includes pumping apparatus 52 which, like all other pumping apparatuses illustrated herein, may be either single stage or multiple stage, and a turbine drive mechanism 54. Turbine drive 54 is disposed to receive and be driven by the entire gaseous output flow from preburner combustion chamber 44.

The second propellant delivery apparatus 16 for delivering fuel to thrust chamber 12 is similar to propellant delivery apparatus 14. It includes a fuel delivery pipeline 56 for delivering fuel to manifold 38 of injector 34, a preburner combustion chamber 58, flow control valves 60 and 62, and a turbopump 64 that includes pumping apparatus 66 and a turbine drive 68.

In operation, propellant flow through pipelines 42 and 56 can be initiated either by gravity, or by use of auxiliary pumping apparatus (not shown). Once propellant flow begins, combustion in chambers 44 and 58 generate gaseous discharges that drive pumps 50 and 64, respectively to pump fuel and oxidizer into thrust chamber 12 at preselected pressures. Oxidizer flows between vanes 36 of injector 34 and mixes with fuel in section 28 of thrust chamber 12. Combustion in chamber 12 can be initiated either by operating preburner chambers 44 and 58 to heat each propellant to the temperature at which those propellants interact combustively, or by use of ignitor apparatus included in chamber 12 (not shown), or with ground-based ignitor apparatus separate from engine 10. Once combustion in chamber 12 is initiated, that combustion generates sufficient heat to continue as long as fuel and oxidizer are received.

Engine 10 can operate in different modes generating different output thrusts. One effective operating mode that provides significant advantage over operation of prior art engines comprises an operating mode in which a liquid hydrocarbon fuel is received by pump 66, liquid oxygen is received by pump 52, and the various control valves of engine 10 are adjusted to provide preburner 44 with an oxygen-rich propellant mixture having an oxidizer-to-fuel mixture ratio of between about 40:1 and 50:1, preburner combustion chamber 44 with a fuel-rich propellant mixture having an oxidizer-to-fuel mixture ratio between 0.2:1 and 0.3:1, and thrust chamber 12 with an oxidizer-to-fuel mixture ratio of between about 2.2:1 and 2.6:1. With these mixture ratios, the preburner combustion chambers operate between 1,000° F and 1,200° F. That temperature is sufficient to entirely convert the propellants to the gaseous state, and drive turbopumps 50 and 64 with sufficient force so that the propellants are injected into thrust chamber 12 at a pressure between about 4,000 and 6,500 psia. The 1,000° F to 1,250° F preburner operating temperature range is sufficiently low so that no preburner cooling apparatus is required. Yet the 4,000 to 6,500 psia pressure range at which the propellants are injected into the thrust chamber is substantially higher than that achieved by prior art engines. The temperatures and pressures at which the gaseous propellants enter thrust chamber 12 cause those propellants to mix with each other very rapidly and provide a combustive interaction that produces an output thrust between about 6,000 and 7,000 lbs force and a thrust-to-weight ratio between about 110 and 130. This thrust-to-weight ratio range is also substantially higher than that provided by any engine previously constructed when operating at that high thrust level.

Figure 2:
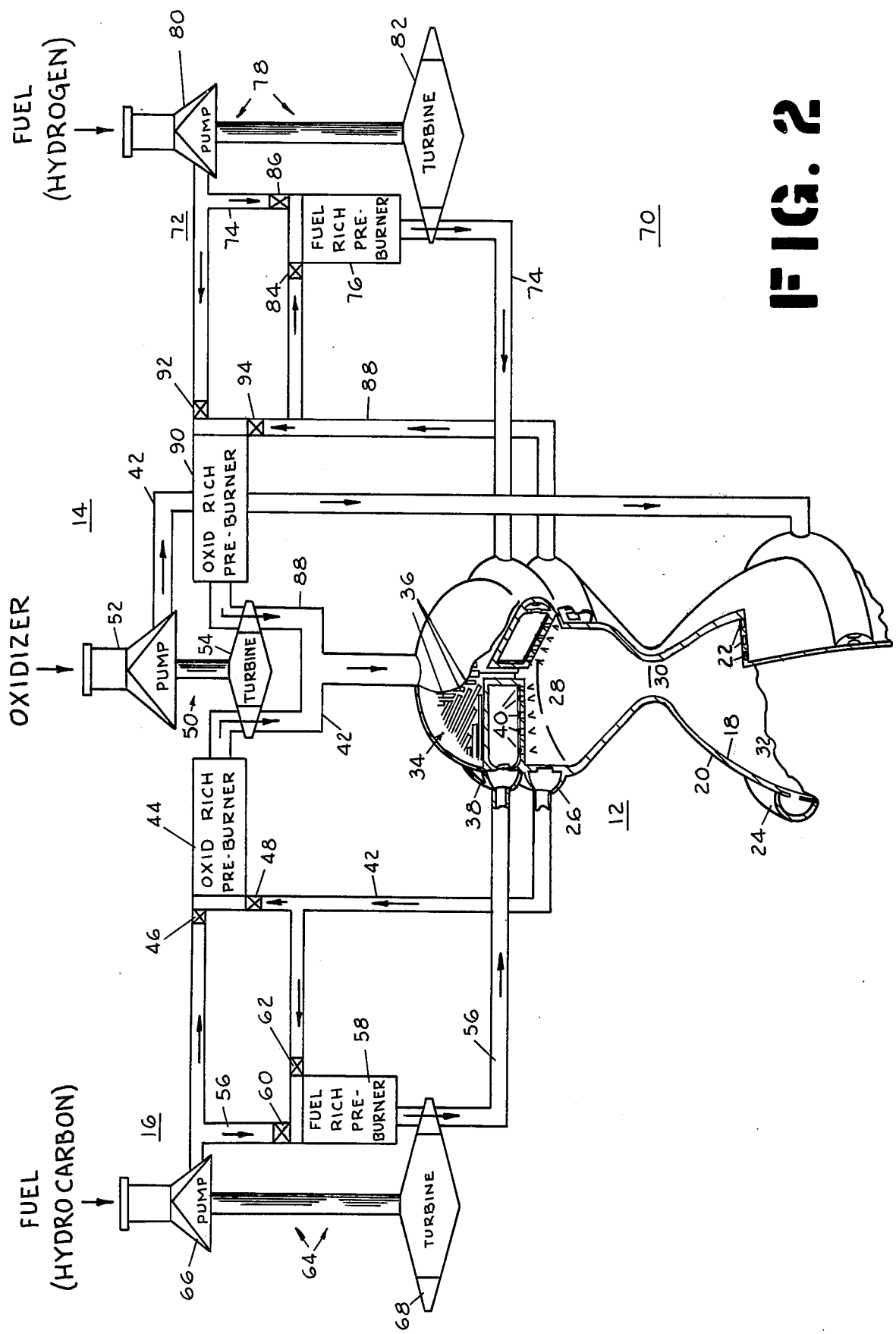
FIG. 2 is a schematic, partially cut-away, box-level drawing of an embodiment of the rocket engine of this invention designed to utilize different propellant combinations during different portions of a mission.

FIG. 2 illustrates a rocket engine 70 in which a third propellant delivery apparatus 72 has been added to the engine 10 in order to convert that engine to one capable of effectively utilizing different propellant combinations during different portions of a rocket flight. Propellant delivery apparatus 72 is similar to delivery apparatus 16. It includes a fuel delivery pipeline 74 for supplying fuel to manifold 38 of injector 34, a preburner combustion chamber 76 for combustibly generating sufficient heat to convert the fuel flowing through pipeline 74 to a high-pressure and temperature gas, and a turbopump 78 for pumping fuel through pipeline 74. Turbopump 78 includes a pump 80, and a turbine drive 82 for driving pump 80. Turbine 82 is disposed to receive and be driven by the entire gaseous output flow from combustion chamber 76. Propellant delivery apparatus 72 also includes control valves 84 and 86 for controlling fuel flow through pipeline 74 and oxidizer flow to preburner 76.

Engine 70 also differs from engine 10 in that oxidizer delivery apparatus 14 includes a second branch pipeline 88 for conveying oxygen from manifold 26 across turbine 54 and into thrust chamber 12. A preburner combustion chamber 90 is disposed in pipeline branch 88, and control valves 92 and 94 control fuel and oxidizer flow into thrust chamber 12 through branch 88. The second branch 88 and second preburner 90 of the oxygen delivery pipeline permits each preburner of engine 70 to have an optimum design for receiving one predetermined fuel and oxidizer. That is, preburner combustion chamber 44 is connected to receive fuel from propellant delivery apparatus 16 but not from propellant delivery apparatus 72 and preburner combustion chamber 90 is connected to receive fuel from propellant delivery apparatus 72, but not from propellant delivery apparatus 14. Each chamber can have an optimum design for handling one predetermined fuel and oxidizer, and the oxidizer flow can be switched between chambers 44 and 90 depending upon the fuel being supplied to thrust chamber 12. The fact that each preburner can have an optimum design for handling one propellant combination is a significant advantage that simplifies the design requirements of engine 70. Each preburner combustion chamber receives propellant in the liquid (supercritical fluid) state. And, different density propellants have significantly different mass flow characteristics, momentum ratios, mixing characteristics, etc., when in the liquid state. It would be difficult to provide a preburner designed to handle liquid propellants of different densities during different portions of a flight.

Engine 70 can operate in many different modes utilizing different propellants, propellant combinations, operating temperatures for the various engine components, pressures at which the propellant is injected into thrust chamber 12, and generate beneath different output thrusts. One operating mode for effectively delivering a payload to orbit comprises supplying a high-density fuel such as hydrocarbon and oxygen to thrust chamber 12 during the first portion of a flight, and a low-density fuel such as hydrogen and oxygen to thrust chamber 12 during the later portion of that flight. In this operating mode, control valves 84, 86, 92, and 94 would be closed during the first interval to prevent hydrogen fuel flow, and valves 46, 48, 60, and 62 are adjusted as previously described to provide primary oxidizer flow through preburner combustion chamber 44, primary fuel flow through preburner combustion chamber 58, and to also supply small quantities of fuel and oxidizer to combustion chambers 44 and 58, respectively, to provide controlled combustion in those chambers. The operating temperatures of the various components and relative quantities of each propellant supplied to each component are as previously described for engine 10. At the end of a first predetermined interval, valves 46, 48, 60, and 62 are closed, and valves 84, 86, 92, and 94 are open to replace the supply to thrust chamber 12 of the high-density hydrocarbon fuel with a low-density hydrogen fuel. When the control valves 84, 86, 92, and 94 are set to provide thrust chamber 12 with between about 6.5:1 and 8:1 (nominal operating point of 7:1) oxygen-to-hydrogen fuel mixture ratio, fuel-rich preburner combustion chamber 76 with an oxygen-to-hydrogen mixture ratio between 0.8:1 and 1:1, and oxygen-rich preburner combustion chamber 90 with an oxygen-to-hydrogen mixture ratio between about 100:1 to 120:1, the preburner combustion chamber operate between about 1,100° F and 1,200° F, and the engine 70 generates an output vacuum thrust between about 500,000 and 600,000 lbs force.

The various components of engine 70 interact with each other during the operation to provide all of the advantageous operating characteristics already discussed with respect to engine 10. For example, as was the case with engine 10, the 1,100° F to 1,200° F operating temperature range of the preburner combustion chambers at which engine 70 can be effectively operated, does not require that the engine 70 include any apparatus for cooling those chambers.

In addition to the advantages already discussed in detail with regard to engine 10, the conversion of each propellant to a high-temperature gas prior to injection into thrust chamber 12 minimizes the differences between the manner in which different propellant combinations having different mass flow rates, momentums, and densities mix in thrust chamber 12. Thus, good propellant mixing and stable combustor interaction generating a high thrust producing gaseous output flow is achieved both during the first interval when a high-density fuel is injected into thrust chamber 12 through injector orifices 40, and during the second interval when a low-density fuel is injected through those same orifices. The separate propellant delivery systems for each propellant also provides excellent control that permits an operation of engine 70 in different modes utilizing different propellant combinations. Another advantage of the rocket engine 70 is that each turbopump receives only one propellant and can therefore have a design that is optimum for handling that one propellant. Similarly, each preburner combustion chamber receives only one combination of propellants. There is thus no need to attempt to design a preburner combustion chamber capable of successfully mixing different liquid propellants during different portions of a mission.

Another advantage of this invention is that the 7:1 oxygen-to-hydrogen mixture ratio provides a high thrust-to-weight ratio output. Prior art hydrogen fuel burning engines operate at a lower oxygen-to-fuel ratio of approximately 6:1. That 6:1 mixture ratio provides a higher specific impulse (output thrust per pound of propellant comsumed per second) that can be obtained at 7:1. It thus at first seems that an engine should be designed for operation at 6:1 and then operated at that value instead of at 7:1 as suggested above. But, operation at 7:1 permits a weight reduction that more than offsets the thrust loss of not operating at 6:1. To explain this weight reduction, note that liquid oxygen is denser than liquid hydrogen. A given quantity of liquid oxygen can therefore be stored in a smaller volume than the same quantity of liquid hydrogen. The overall size and weight of the tanks for storing hydrogen and oxygen can thus be reduced by operating at 7:1 instead of 6:1. And a rocket vehicle having an engine burning hydrogen fuel at 7:1 mixture ratio will thus provide a higher output thrust-to-weight ratio than will a vehicle having a hydrogen-burning engine operating with a 6:1 mixture ratio even though the 6:1 mixture ratio will generate a higher thrust. If desired, the storage tank size and weight can be further decreased, and the output thrust-to-weight ratio of the vehicle further increased, by storing the propellants at as low temperatures as possible, or in other words near their freezing points, to further decrease the volume required to store a given mass of propellant. The various preburner combustion chambers of engine 70 permit that engine to generate sufficient heat to convert very low temperature liquid propellants to the gaseous state prior to injection into thrust chamber 12 without requiring operating of any preburner combustion chamber at a high temperature that would require cooling apparatus. Furthermore, for engine 70, the receipt of oxidizer previously stored at as low a temperature as possible facilitates cooling of thrust chamber 12.

The various operating advantages of engine 70 permit a typical embodiment of that engine to provide an output having an overall thrust-to-weight ratio of about 70 in a typical earth-to-earth orbit mission having one hydrocarbon fuel burning mode and one hydrogen fuel burning mode as described in detail above. This is substantially better than can be achieved with any presently known two-stage rocket vehicle having one hydrocarbon fuel burning state and one hydrogen fuel burning stage. The best embodiments of such vehicles now being constructed and known to applicant generate an overall thrust-to-weight ratio output for an entire mission of only about 55.

Figure 3:
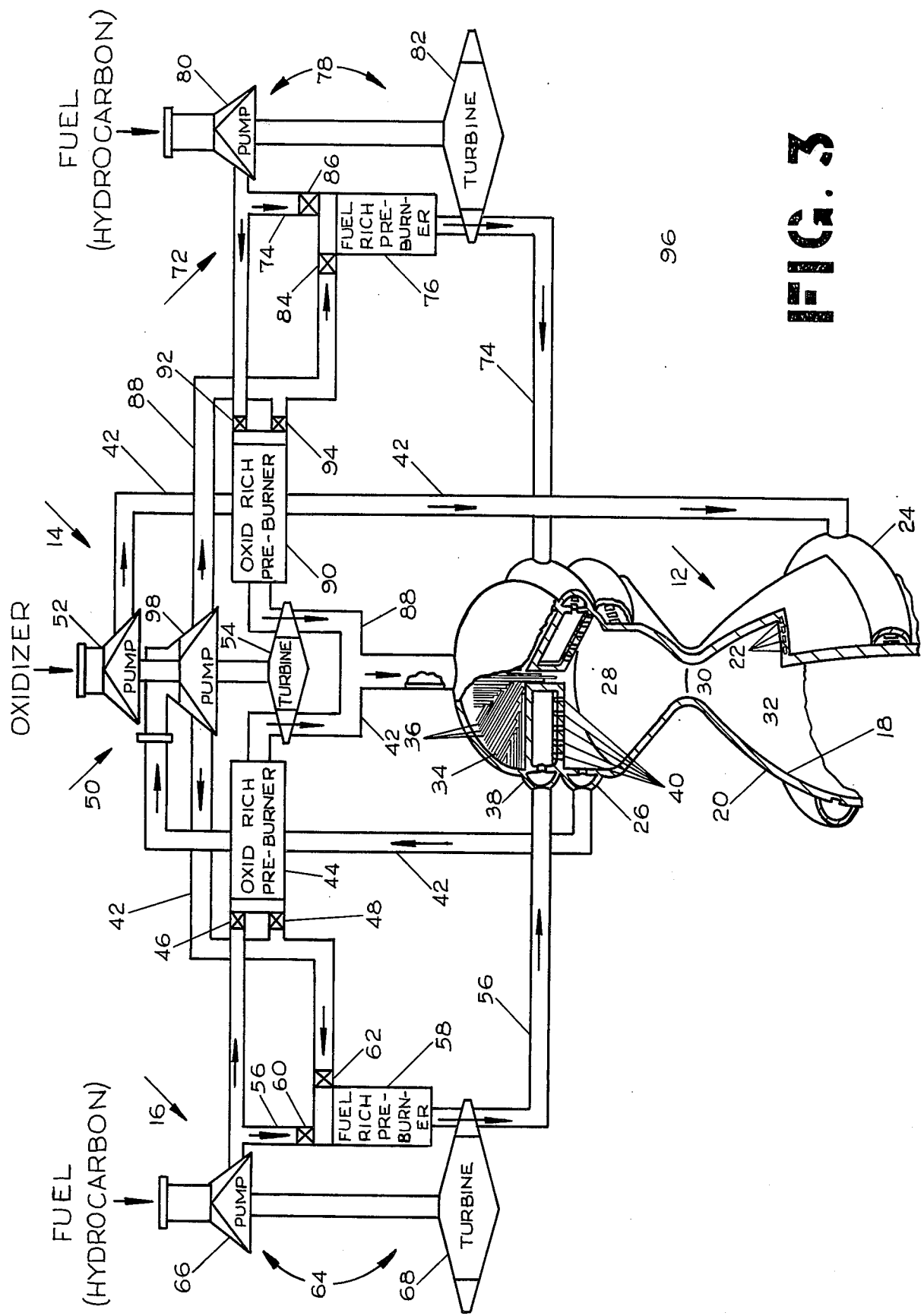
FIG. 3 illustrates a modification of the embodiment of FIG. 2 that includes a two-stage oxidizer delivery pump.

FIG. 3 illustrates a second embodiment 96 of a rocket engine for utilizing different propellant combinations having different densities during different portions of a rocket flight. Rocket engine embodiment 96 differs from engine 70 in that oxidizer delivery pump 50 has been modified to include a second stage 98, which like the first stage 52, is also driven by turbine 54. And, the second branch 88 of the pipeline for delivering oxidizer to thrust chamber 12 splits from the first branch 42 of that pipeline at pump 98 instead of at manifold 38 as in engine 70. The second stage 98 of pump 50 improves the thrust-to-weight ratio performance of a rocket engine. Even though pump stage 98 adds weight it increases the overall thrust-to-weight ratio. That is, it reduces the pressure that must be provided by stage 52 in order to inject oxidizer into thrust chamber 12 at a preselected, desired pressure, and thereby reduces the wall thicknesses required for pipeline 42, and thrust chamber walls 18 and 20. The reduction in pressure that must be provided by first pump stage 52 also reduces the driving force that must be provided by turbine 54, as well as the pressures of the gaseous discharges that need be provided by preburner combustion chambers 44 and 90. The size and weight of those elements can therefore also be reduced.

Operation of engine 72 is similar to that of engine 70. With regard to operation of pump 50, stage 48 pumps liquid oxygen through pipeline 42 and cooling passageways 22 to second stage 98 which pumps that liquid oxygen into thrust chamber 12. The pressures to which each stage pumps received fluid will vary from one embodiment to another. Second stage 98 may be designed to pump fluid to a higher pressure than that provided by first stage 48. But, this is not necessarily the case. Liquid oxygen loses pressure as it flows through the conduit passageways. The second pumping stage 98 therefore may in some embodiments be simply designed to return the liquid oxygen to the pressure originally provided by pump 48, or to some slightly lesser pressure.

Figure 4:
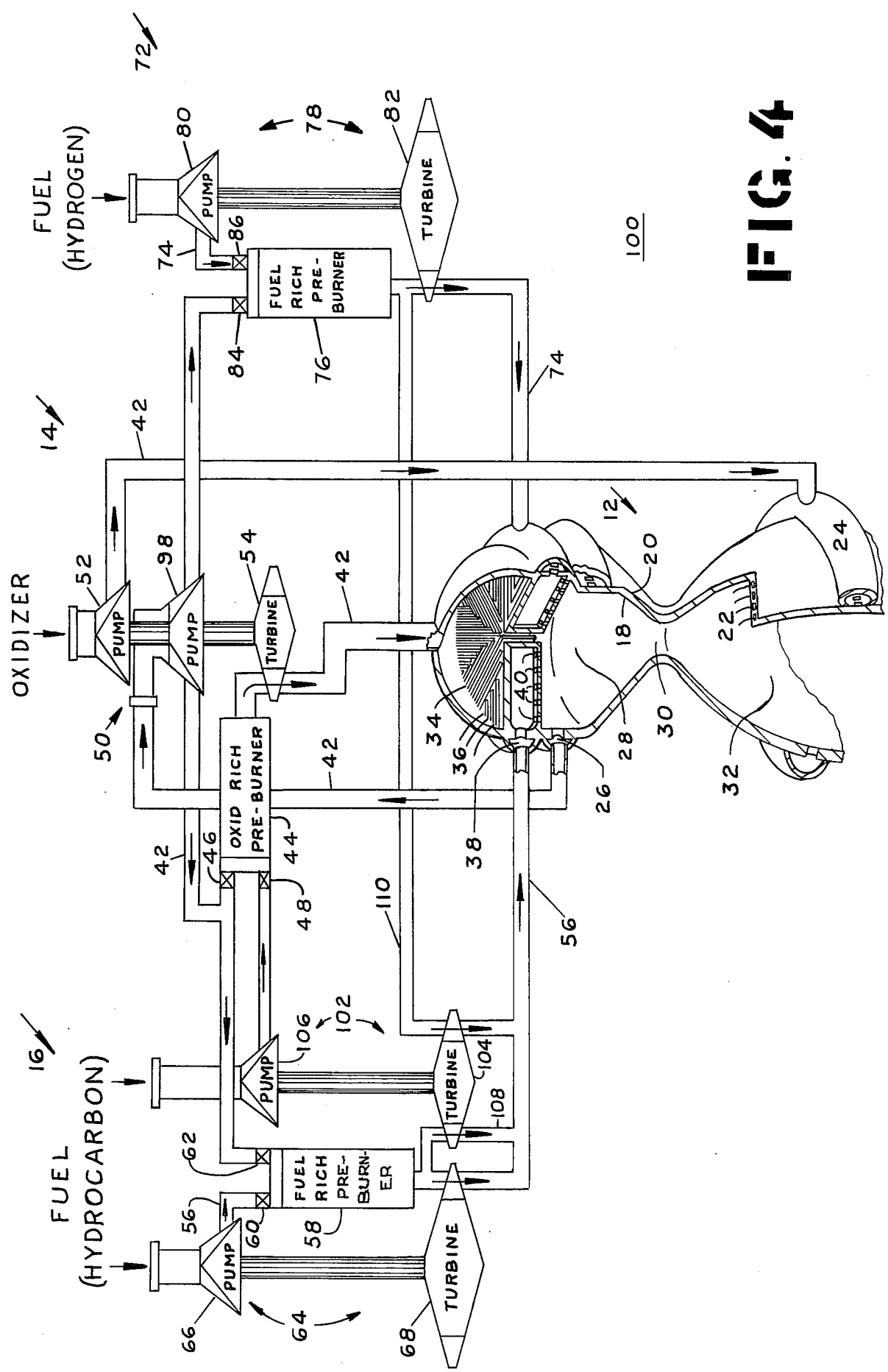
FIG. 4 illustrates a modification of the embodiments of FIGS. 2 and 3 that includes one less preburner than do those embodiments.

FIG. 4 illustrates a third rocket engine 100 for utilizing different propellants during different portions of a rocket flight. Engine 100 differs from engines 70 and 96 in that oxidizer delivery apparatus 14 does not include a second pipeline branch 88 and preburner combustion chamber 90 for supplying oxygen to thrust chamber 12 when a low-density hydrogen fuel is being supplied to the thrust chamber by propellant delivery apparatus 72. Instead, oxygen is supplied to thrust chamber 12 through the one conduit pathway 42 and preburner combustion chamber 12. In order to insure that each preburner combustion chamber need receive only one fuel and one oxidizer during all operating modes and still enable engine 100 to operate in different modes using different propellant combinations, fuel delivery apparatus 16 has been modified to include a second turbopump 102 having a turbine drive 104 and pumping apparatus 106 for delivering a small quantity of hydrocarbon fuel to preburner combustion chamber 44 both during a first operating mode in which the engine 10 is burning the high-density hydrocarbon fuel, and during a second operating mode in which engine 100 is burning the low-density hydrogen fuel. Pipelines 108 and 110 connect turbine drive 104 with preburner combustion chambers 58 and 76, respectively. Turbine drive 104 thus receives gaseous discharges from both of those preburner combustion chambers. A gaseous discharge from either chamber 58 or 76 drives turbine 104 so that pump apparatus 106 delivers hydrocarbon fuel to preburner combustion chamber 44 both during a first operating mode when hydrocarbon fuel is being injected through injector 34 into thrust chamber 12, and during a second operating mode when low-density hydrogen fuel is being so injected into the thrust chamber.

Operation of engine 100 is similar to that of engines 70 and 96 except for the fact that pump 102 supplies a small quantity of hydrocarbon fuel to oxygen-rich preburner combustion chamber 44 whenever either hydrocarbon fuel or hydrogen fuel is being supplied to thrust chamber 12. One significant operating advantage of engine 100 is that pump 102 permits the engine 100 to be operated in a manner that simplifies the problem of cooling the walls of thrust chamber 12. A thin layer of soot tends to form on the inner wall 20 of thrust chamber 12 when only hydrocarbon fuel and oxygen are supplied to that thrust chamber. This soot layer facilitates cooling of the thrust chamber walls by acting as a heat insulator that protects those walls from the heat of the combustive interaction occurring inside the thrust chamber. That soot layer may burn off when hydrogen is burned in the thrust chamber 12 instead of a hydrocarbon fuel. The problem of adequately cooling the thrust chamber walls is thus normally more difficult during a hydrogen-burning mode than during a hydrocarbon fuel-burning mode. But, the heat insulating soot layer can be maintained on the inner wall 20 of thrust chamber 12 during the hydrogen fuel-burning mode by operating preburner combustion chamber 44 at a temperature that is sufficiently low so that a small quantity of the hydrocarbon fuel supplied to operate that preburner combustion chamber will not be consumed in that chamber but will, instead, be supplied to thrust chamber 12.

Having thus described a new and improved rocket engine design that can be embodied in either an engine that effectively utilizes one fuel and one oxidizer, or in an engine capable of effectively utilizing different propellants having different densities during different portions of a rocket mission, a number of modifications will readily occur to others. Therefore,

What is claimed is:

1. A rocket engine for effectively utilizing different propellant combinations having different densities during different portions of a rocket flight, said engine comprising:

a thrust chamber for receiving combustibly interactive propellants and providing a thrust-generating gaseous output flow;

first propellant delivery means for supplying a high-density propellant to said thrust chamber;

second propellant delivery means for supplying a low-density propellant to said thrust chamber; and third propellant delivery means for supplying a propellant that is combustibly interactive with both said high-density and said low-density propellants to said thrust chamber, said third propellant delivery means including pump means, first preburner means for combustibly interacting said first and third propellants to produce a gaseous output, second preburner means for combustibly interacting said second and third propellants to produce a gaseous output, and motor means for driving said pump means disposed to receive the gaseous outputs from both said first and second preburner means and be driven by either of said outputs; and control means for varying the relative quantities of said propellants supplied to said thrust chamber to thereby provide the thrust chamber with different propellant combinations having different densities during different portions of a rocket flight.

2. The rocket engine of claim 1 in which:

said thrust chamber includes means defining a thrust chamber coolant passageway;

said third propellant delivery means include first conduit means for conveying said combustibly interactive propellant to said coolant passageway, and second conduit means for conveying said combustibly interactive propellant from said coolant passageway into said thrust chamber;

said pump means is disposed to pump said combustibly interactive propellant to a first predetermined pressure before entering said coolant passageway; and said third propellant delivery means further includes second pump means for receiving said combustibly interactive propellant from said coolant passageway and pumping said combustibly interactive propellant to a second predetermined pressure.

3. A rocket engine of claim 2 in which:

said third propellant delivery motor means, pump means, and second pump means comprise a two-stage turbopump with said motor means comprising a turbopump turbine, said pump means comprising a first stage pump of said turbopump, and said second pump means comprising a second stage pump of said turbopump.

4. The rocket engine of claim 1 in which:

said third propellant delivery means include conduit means defining first and second paths for conveying said combustibly interactive propellant to said thrust chamber;

said first preburner means form a portion of said first path; and said second preburner means form a portion of said second path 5. The rocket engine of claim 4 in which said control means include:

means for blocking flow of said low-density propellant to said thrust chamber and all flow through said second preburner means to thereby cause the engine to operate in a first mode utilizing substantially only said high-density propellant and said combustibly interactive propellant; and means for blocking flow of said high-density propellayt to said thrust chamber, and all propellant flow through said first preburner means to thereby cause the engine to operate in a second mode utilizing substantially only low-density propellant and said combustibly interactive propellant 6. The rocket engine of claim 1 in which:

said first and second propellant delivery means each include pump means, motor means for driving said pump means, and preburner means for providing a gaseous output driving said motor means.

7. The rocket engine of claim 6 in which:

said first propellant delivery pump means and motor means comprise a first turbopump;

said second propellant delivery pump means and motor means comprise a second turbopump; and said third propellant delivery pump means and motor means comprise a third turbopump having a drive turbine disposed to receive the entire gaseous output flows from both said first and second preburner means and to be driven by a gaseous output flow received from either one of said first and second preburner means.

8. The rocket engine of claim 6 in which:

said first propellant delivery preburner means is disposed to receive substantially all of said high-density propellant and a small quantity of said combustibly interactive propellant, both in the liquid state, and provide a controlled combustive interaction generating sufficient heat to convert substantially all of said received high-density propellant to a gas; and said second propellant delivery preburner means is disposed to receive substantially all of said low-density propellant and a small quantity of said combustibly interactive propellant, both in the liquid state, and provide a controlled combustive interaction generating sufficient heat to convert substantially all of said received low-density propellant to a gas.

9. A rocket engine for effectively utilizing different propellant combinations having different densities during different portions of a rocket flight, said engine comprising:

a thrust chamber for receiving combustibly interactive propellants and providing a thrust generating gaseous output flow;

first, second and third propellant delivery means for respectively supplying a high-density propellant, a low-density propellant, and a third propellant that is combustibly interactive with both said high-density and said low-density propellants to said thrust chamber; each of said propellant delivery means including pump means, motor means for driving said pump means, and preburner means for providing a gaseous output driving said motor means;

additional pump means forming a portion of said third propellant delivery means for pumping said high-density propellant to said third propellant delivery preburner means; and motor means for driving said high density pump means disposed to receive the gaseous outputs from both said first and second propellant delivery preburner means and be driven by either one of said outputs; and control means for varying the relative quantities of said propellants supplied to said thrust chamber to thereby provide the thrust chamber with different propellant combinations having different densities during different portions of a rocket flight.

10. A rocket engine for effectively utilizing different propellant combinations having different densities during different portions of a rocket flight, said engine comprising:

a thrust chamber for receiving combustibly interactive propellants and providing a thrust generating gaseous output flow;

an injector having a propellant-receiving manifold, and means defining a plurality of orifices for injecting propellants into said thrust chamber, each of said orifices communicating with said manifold;

first propellant delivery means for receiving a high-density liquid propellant and conveying said high-density propellant to said injector manifold;

second propellant delivery means for receiving a low-density liquid propellant and conveying said low-density propellant to said injector manifold so that high and low-density propellants both enter said thrust chamber through the same injector orifices;

third propellant delivery means for receiving a liquid propellant combustibly interacting with both high and said low-denstiy propellants and supplying said interactive propellant to said thrust chamber;

control means for varying the relative quantities of said propellants supplied to said thrust chamber to thereby provide different combinations having different densities during different portions of a rocket flight; and means for converting each of said propellants to a gas before entering said thrust chamber to minimize differences between the manner in which different propellants interact combustibly with each other so that different propellants having different densities can be injected into said thrust chamber through the same orifices during different portions of a rocket flight and provide stable, high-thrust generating combustive interaction.

11. The rocket engine of claim 10 in which said control means comprise:

means for activating said first and third propellant delivery means while blocking said second propellant delivery means to thereby cause the engine to operate in a first mode utilizing substantially only said high-density and said combustibly interactive propellants; and means for activating said second and third propellant delivery means while blocking said first propellant delivery means to thereby cause the engine to operate in a second mode utilizing substantially only said low-density and said combustibly interactive propellants.

12. The rocket engine of claim 11 in which said means for converting each of said propellants to a gas include:

first preburner combustor means for combustibly interacting small portions of said propellants to generate sufficient heat to convert said high-density propellant to a gas;

second preburner combustor means for combustibly interacting small portions of said propellants to generate sufficient heat to convert said low-density propellant to a gas;

third preburner combustor means for combustibly interacting small portions of said propellants to generate sufficient heat to convert said combustibly interactive propellant to a gas.

13. The rocket engine of claim 12 in which:

said first propellant delivery means includes first turbopump means disposed to receive and be driven by gaseous output flow provided by said first preburner combustor means;

said second propellant delivery means includes a second turbopump means disposed to receive and be driven by gaseous output flow provided by said second preburner combustor means;

said third propellant delivery means includes third turbopump means disposed to receive and be driven by gaseous output flow provided by said third preburner combustor means.

14. a rocket engine for utilizing different propellants having different heat capacities during different portions of a rocket flight comprising:

a thrust chamber for receiving combustibly interactive propellants and providing a thrust generating gaseous output flow;

first propellant delivery means for delivering a first propellant to said thrust chamber along a first path;

second propellant delivery means for supplying a second propellant to said thrust chamber along a second path;

third propellant delivery means for supplying a third propellant that is combustibly interactive with both said first and said second propellants to said thrust chamber along a third path that brings said third propellant sufficiently close to said combustion chamber for a sufficiently long interval to cause said third propellant to absorb heat and cool said thrust chamber, said third propellant delivery means including first pump means for pumping said combustibly interactive propellant to a first predetermined pressure before entering said heat absorbing portion of said third path, and second pump means for receiving said combustibly interactive propellant from said heat absorbing portion of said third path and pumping said combustibly interactive propellant to a second predetermined pressure; and control means for varying the relative quantities of said propellants supplied to said thrust chambers during different portions of a rocket flight.

15. The rocket engine of claim 14 in which said first and second pumping means comprise first and second stages of a two-stage turbopump.

16. The rocket engine of claim 14 in which said first, second, and third propellant delivery means each include:

preburner combustor means for combustibly interacting small portions of said propellants to generate sufficient heat to convert substantially all of the propellant being supplied by that delivery means to the gaseous state before entering said thrust chamber;

means for pumping propellant to said thrust chamber; and motor means for driving said pump means disposed to receive and be driven by gaseous flow from said preburner combustor means.

* * * * *